(12) United States Patent
Phillips et al.

(10) Patent No.: US 11,637,513 B2
(45) Date of Patent: Apr. 25, 2023

(54) METHODS OF OPTIMIZING WAVEFORMS FOR ELECTRIC MOTORS

(71) Applicant: Tula eTechnology, Inc., San Jose, CA (US)

(72) Inventors: Andrew W. Phillips, Rochester, MI (US); Matthew A. Younkins, Campbell, CA (US); Paul Carvell, San Jose, CA (US); John M. Fuerst, Campbell, CA (US)

( * ) Notice: Subject to any disclaimer, the term of this patent is extended or adjusted under 35 U.S.C. 154(b) by 0 days.

(21) Appl. No.: 17/695,663

(22) Filed: Mar. 15, 2022

(65) Prior Publication Data
US 2022/0294368 A1 Sep. 15, 2022

Related U.S. Application Data

(60) Provisional application No. 63/219,441, filed on Jul. 8, 2021, provisional application No. 63/161,405, filed on Mar. 15, 2021.

(51) Int. Cl.
*H02P 6/10* (2006.01)
*H02P 101/45* (2016.01)

(52) U.S. Cl.
CPC ............ *H02P 6/10* (2013.01); *H02P 2101/45* (2015.01); *H02P 2205/05* (2013.01)

(58) Field of Classification Search
CPC ..... H02P 6/10; H02P 2101/45; H02P 2205/05
See application file for complete search history.

(56) References Cited

U.S. PATENT DOCUMENTS

| | | | |
|---|---|---|---|
| 4,441,043 | A | 4/1984 | DeCesare |
| 4,989,146 | A | 1/1991 | Imajo |
| 5,099,410 | A | 3/1992 | Divan |
| 5,151,637 | A | 9/1992 | Takada et al. |
| 5,325,028 | A | 6/1994 | Davis |
| 5,483,141 | A | 1/1996 | Uesugi |
| 5,640,073 | A | 6/1997 | Ikeda et al. |

(Continued)

FOREIGN PATENT DOCUMENTS

| | | |
|---|---|---|
| CN | 1829070 A | 9/2006 |
| CN | 102381265 A | 3/2012 |

(Continued)

OTHER PUBLICATIONS

"Pulse width modulation inverters; Sang-Hoon Kim, in Electric Motor Control, 2017" "https://www.sciencedirect.com/topics/engineering/sinusoidal-pulse-width-modulation" (Year: 2017).*

(Continued)

*Primary Examiner* — Muhammad S Islam
*Assistant Examiner* — Bradley R Brown
(74) *Attorney, Agent, or Firm* — Womble Bond Dickinson (US) LLP

(57) ABSTRACT

A method of controlling an electric motor includes receiving a duty cycle for the electric motor for delivering a target torque from the electric motor, generating a pulse train, and pulsing the electric motor with the generated pulse train. Generating the pulse train being at least partially based on the received duty cycle. The generated pulse train optimized to improve at least one of noise, vibration, or harshness of the electric motor when compared to a constant pulse frequency.

28 Claims, 8 Drawing Sheets

(56) References Cited

U.S. PATENT DOCUMENTS

| | | |
|---|---|---|
| 5,731,669 A | 3/1998 | Shimizu et al. |
| 6,291,960 B1 | 9/2001 | Crombez |
| 6,308,123 B1 | 10/2001 | Ikegaya et al. |
| 6,370,049 B1 | 4/2002 | Heikkilae |
| 6,424,799 B1 | 7/2002 | Gilmore |
| 6,493,204 B1 | 12/2002 | Glidden et al. |
| 6,605,912 B1 | 8/2003 | Bharadwaj et al. |
| 6,829,515 B2 | 12/2004 | Grimm |
| 6,829,556 B2 | 12/2004 | Kumar |
| 6,906,485 B2 | 6/2005 | Hussein |
| 6,940,239 B2 | 9/2005 | Iwanaga et al. |
| 7,190,143 B2 | 3/2007 | Wei et al. |
| 7,259,664 B1 | 8/2007 | Cho et al. |
| 7,327,545 B2 | 2/2008 | Konishi |
| 7,411,801 B2 | 8/2008 | Welchko et al. |
| 7,453,174 B1 | 11/2008 | Kalsi |
| 7,558,655 B2 | 7/2009 | Garg et al. |
| 7,577,511 B1 | 8/2009 | Tripathi et al. |
| 7,616,466 B2 | 11/2009 | Chakrabarti et al. |
| 7,768,170 B2 | 8/2010 | Tatematsu et al. |
| 7,852,029 B2 | 12/2010 | Kato et al. |
| 7,969,341 B2 | 6/2011 | Robbe et al. |
| 8,020,651 B2 | 9/2011 | Zillmer et al. |
| 8,099,224 B2 | 1/2012 | Tripathi et al. |
| 8,768,563 B2 | 7/2014 | Nitzberg et al. |
| 8,773,063 B2 | 7/2014 | Nakata |
| 9,046,559 B2 | 6/2015 | Lindsay et al. |
| 9,050,894 B2 | 6/2015 | Banerjee et al. |
| 9,308,822 B2 | 4/2016 | Matsuda |
| 9,495,814 B2 | 11/2016 | Ramesh |
| 9,512,794 B2 | 12/2016 | Serrano et al. |
| 9,630,614 B1 | 4/2017 | Hill et al. |
| 9,702,420 B2 | 7/2017 | Yoon |
| 9,758,044 B2 | 9/2017 | Gale et al. |
| 9,948,173 B1 | 4/2018 | Abu Qahouq |
| 10,060,368 B2 | 8/2018 | Pirjaberi et al. |
| 10,081,255 B2 | 9/2018 | Yamada et al. |
| 10,256,680 B2 | 4/2019 | Hunstable |
| 10,273,894 B2 | 4/2019 | Tripathi |
| 10,291,168 B2 | 5/2019 | Fukuta |
| 10,291,174 B2 | 5/2019 | Irie et al. |
| 10,344,692 B2 | 7/2019 | Nagashima et al. |
| 10,381,968 B2 | 8/2019 | Agirman |
| 10,476,421 B1 | 11/2019 | Khalil et al. |
| 10,550,776 B1 | 2/2020 | Leone et al. |
| 10,742,155 B2 | 8/2020 | Tripathi |
| 10,944,352 B2 | 3/2021 | Mazda et al. |
| 11,088,644 B1 | 8/2021 | Carvell |
| 11,133,767 B2 | 9/2021 | Serrano et al. |
| 2001/0039926 A1 | 11/2001 | Kobayashi et al. |
| 2002/0043954 A1 | 4/2002 | Hallidy |
| 2005/0127861 A1 | 6/2005 | McMillan et al. |
| 2005/0151437 A1 | 7/2005 | Ramu |
| 2005/0160771 A1 | 7/2005 | Hosoito et al. |
| 2007/0216345 A1 | 9/2007 | Kanamori |
| 2007/0287594 A1 | 12/2007 | DeGeorge et al. |
| 2008/0129243 A1 | 6/2008 | Nashiki |
| 2008/0179980 A1 | 7/2008 | Dawsey et al. |
| 2009/0045691 A1 | 2/2009 | Ichiyama |
| 2009/0121669 A1 | 5/2009 | Hanada |
| 2009/0128072 A1 | 5/2009 | Strong et al. |
| 2009/0146615 A1 | 6/2009 | Zillmer et al. |
| 2009/0179608 A1 | 7/2009 | Welchko et al. |
| 2009/0306841 A1 | 12/2009 | Miwa et al. |
| 2010/0010724 A1 | 1/2010 | Tripathi et al. |
| 2010/0201294 A1 | 8/2010 | Yuuki et al. |
| 2010/0296671 A1 | 11/2010 | Khoury et al. |
| 2011/0029179 A1 | 2/2011 | Miyazaki et al. |
| 2011/0089774 A1 | 4/2011 | Kramer |
| 2011/0106350 A1* | 5/2011 | Jalbout .............. B60L 50/00 701/22 |
| 2011/0130916 A1 | 6/2011 | Mayer |
| 2011/0208405 A1 | 8/2011 | Tripathi et al. |
| 2012/0056569 A1 | 3/2012 | Takamatsu et al. |
| 2012/0112674 A1 | 5/2012 | Schulz et al. |
| 2012/0169263 A1 | 7/2012 | Gallegos-Lopez et al. |
| 2012/0217921 A1 | 8/2012 | Wu et al. |
| 2013/0134912 A1 | 5/2013 | Khalil et al. |
| 2013/0141027 A1 | 6/2013 | Nakata |
| 2013/0226420 A1 | 8/2013 | Pedlar et al. |
| 2013/0241445 A1 | 9/2013 | Tang |
| 2013/0258734 A1 | 10/2013 | Nakano et al. |
| 2014/0018988 A1 | 1/2014 | Kitano et al. |
| 2014/0028225 A1 | 1/2014 | Takamatsu et al. |
| 2014/0130506 A1 | 5/2014 | Gale et al. |
| 2014/0176034 A1 | 6/2014 | Matsumura et al. |
| 2014/0217940 A1 | 8/2014 | Kawamura |
| 2014/0265957 A1 | 9/2014 | Hu et al. |
| 2014/0292382 A1 | 10/2014 | Ogawa et al. |
| 2014/0354199 A1 | 12/2014 | Zeng et al. |
| 2015/0025725 A1 | 1/2015 | Uchida |
| 2015/0240404 A1 | 8/2015 | Kim et al. |
| 2015/0246685 A1 | 9/2015 | Dixon et al. |
| 2015/0261422 A1 | 9/2015 | Den et al. |
| 2015/0297824 A1 | 10/2015 | Cabiri et al. |
| 2015/0318803 A1 | 11/2015 | Wu et al. |
| 2016/0114830 A1 | 4/2016 | Dixon et al. |
| 2016/0226409 A1 | 8/2016 | Ogawa |
| 2016/0233812 A1 | 8/2016 | Lee et al. |
| 2016/0269225 A1 | 9/2016 | Kirchmeier et al. |
| 2016/0373047 A1 | 12/2016 | Loken et al. |
| 2017/0087990 A1 | 3/2017 | Neti et al. |
| 2017/0331402 A1 | 11/2017 | Smith et al. |
| 2018/0032047 A1 | 2/2018 | Nishizono et al. |
| 2018/0045771 A1 | 2/2018 | Kim et al. |
| 2018/0154786 A1 | 6/2018 | Wang et al. |
| 2018/0276913 A1 | 9/2018 | Garcia et al. |
| 2018/0323665 A1 | 11/2018 | Chen et al. |
| 2018/0334038 A1 | 11/2018 | Zhao et al. |
| 2019/0058374 A1 | 2/2019 | Enomoto et al. |
| 2019/0288629 A1 | 9/2019 | Tripathi |
| 2019/0288631 A1* | 9/2019 | Tripathi ............ H02P 27/08 |
| 2020/0212834 A1 | 7/2020 | Mazda et al. |
| 2020/0262398 A1 | 8/2020 | Sato et al. |
| 2020/0328714 A1 | 10/2020 | Tripathi |
| 2020/0343849 A1 | 10/2020 | Coroban-Schramel |
| 2020/0366223 A1 | 11/2020 | Coroban-Schramel |
| 2021/0203263 A1 | 7/2021 | Serrano et al. |
| 2021/0351733 A1 | 11/2021 | Carvell |

FOREIGN PATENT DOCUMENTS

| | | |
|---|---|---|
| CN | 104716754 A | 6/2015 |
| CN | 204589885 U | 8/2015 |
| CN | 105196877 A | 12/2015 |
| CN | 205229379 U | 5/2016 |
| CN | 106932208 A | 7/2017 |
| CN | 107067780 A | 8/2017 |
| CN | 207129052 U | 3/2018 |
| CN | 108216026 A | 6/2018 |
| CN | 108445386 A | 8/2018 |
| EP | 2605398 A1 | 6/2013 |
| FR | 2989479 A1 | 10/2013 |
| JP | 10-243680 A | 9/1998 |
| JP | 2008-079686 A | 4/2008 |
| JP | 2009-065758 A | 3/2009 |
| JP | 2014-033449 A | 2/2014 |
| JP | 2017-011970 A | 1/2017 |
| JP | 2017-200382 A | 11/2017 |
| JP | 2018-033250 A | 3/2018 |
| KR | 10-2010-0021146 A | 2/2010 |
| KR | 10-2017-0021146 A | 2/2017 |
| KR | 10-2017-0032976 A | 3/2017 |
| WO | 03/36787 A1 | 5/2003 |
| WO | 2012/010993 A2 | 1/2012 |
| WO | PCT/US2022/020444 | 3/2022 |

OTHER PUBLICATIONS

Cai et al., "Torque Ripple Reduction for Switched Reluctance Motor with Optimized PWM Control Strategy", Energies, vol. 11, Oct. 15, 2018, pp. 1-27.

Carvell et al, U.S. Appl. No. 17/204,269, filed Mar. 17, 2021.

(56) References Cited

OTHER PUBLICATIONS

Carvell, U.S. Appl. No. 16/866,917, filed May 5, 2020.
Carvell, U.S. Appl. No. 17/188,189, filed Mar. 1, 2021.
Islam, U.S. Appl. No. 17/220,228, filed Apr. 1, 2021.
Luckjiff et al., "Hexagonal$Sigma Delta$Modulators in Power Electronics", IEEE Transactions on Power Electronics, vol. 20, No. 5, Sep. 2005, pp. 1075-1083.
Mirzaeva et al., "The use of Feedback Quantizer PWM for Shaping Inverter Noise Spectrum", Power Electronics and Motion Control Conference (EPE/PEMC), 2012 15th International IEEE, Sep. 4, 2012, pp. DS3c. 10-1, XP032311951, DOI: 10.1109/EPEPEMC.2012.6397346, ISBN: 978-1-4673-1970.6.
Ramsey, "How this father and son's new electric turbine could revolutionize electric cars; The Hunstable Electric Turbine can produce up to three times the torque of any other motor", Available Online at <https://www.autoblog.com/2020/03/08/hunstable-electric-turbine/>, Mar. 8, 2020, 9 pages.
Serrano et al, U.S. Appl. No. 16/689,450, filed Nov. 20, 2019.
Spong et al., "Feedback Linearizing Control of Switched Reluctance Motors", IEEE Transactions on Automatic Control, vol. AC-32, No. 5, May 1987, pp. 371-379.
Srinivasan, U.S. Appl. No. 17/158,230, filed Jan. 26, 2021.
Srinivasan, U.S. Appl. No. 17/188,509, filed Mar. 1, 2021.
Tripathi, U.S. Appl. No. 16/353,159, filed Mar. 14, 2019.
Tripathi, U.S. Appl. No. 16/912,313, filed Jun. 25, 2020.
Tripathi, U.S. Appl. No. 16/353,166, filed Mar. 14, 2019.
International Search Report and the Written Opinion for PCTUS2220444.

\* cited by examiner

METHODS OF OPTIMIZING WAVEFORMS FOR ELECTRIC MOTORS

CROSS-REFERENCE TO RELATED APPLICATIONS

This application claims the benefit of, and priority to, U.S. Provisional Patent Application Ser. No. 63/219,441, filed Jul. 8, 2021, and U.S. Provisional Patent Application Ser. No. 63/161,405, filed Mar. 15, 2021. The entire contents of each of these applications are hereby incorporated by reference.

BACKGROUND

1. Technical Field

The present disclosure relates to methods of optimizing waveforms for electric motors, and more specifically, to optimizing waveforms to improve noise, vibration, and harness characteristics of pulsed electric motors.

2. Discussion of Related Art

Electrification of transportation cuts reliance on fossil fuels, mitigates climate change, and eliminates tailpipe emissions. Given that the amount and cost of energy consumed by electric vehicles may soon rival those of fossil fueled vehicles, the efficiency of electric energy usage may become as critical as that of legacy energy sources.

Improving the efficiency of battery-electric vehicle powertrains may improve the viability of electric vehicles. Although the peak efficiencies of electric motors equipped with rare earth magnets exceed 90%, practical drive cycles and powertrain architectures frequently operate outside of this peak efficiency speed/load region. For example, at 10% of the maximum torque of an electric vehicle, efficiency may be in a range of 70-85%. In addition, many electric motors use magnets with large content of Neodymium or Samarium, both of which are expensive and have limited sources of supply.

Electric motors are known to be efficient at providing continuous torque to driven equipment. The torque delivery of electric motors is typically continuous without the pulsations associated with an internal combustion engine. Generally, electric motors have an optimal efficiency point in mid-low to mid-high range of torque relative to a maximum torque of the electric motor. For example, the maximum efficiency of an electric motor may be in a range of 30% to 80% of the maximum torque of the electric motor.

When an electric motor provides a continuous torque in a low range of the maximum torque of the electric motor, e.g., below 20% of the maximum torque, the efficiency of the electric motor is typically low. It has been found that reducing a duty cycle of the electric motor by pulsing the electric motor at the optimal efficiency point can provide a target torque in a low range of the electric motor at a higher efficiency than providing a continuous torque from the electric motor. The pulsing of the electric motor at the optimal efficiency point includes delivering pulses at a modulation frequency.

The pulsing of the electric motor at a modulation frequency can induce vibrations in equipment driven by the electric motor. For example, when the electric motor is driving a vehicle, the pulsing of the electric motor can create vibrations in the structure of the vehicle. These vibrations can be amplified when the modulation frequency is near a natural frequency resonance of the vehicle structure.

SUMMARY

This disclosure relates generally to methods of optimizing pulses of a pulse train for an electric motor to reduce or cancel vibrations resulting from pulsing of the electric motor.

In an embodiment of the present disclosure, a method of controlling an electric motor includes receiving a duty cycle for an electric motor, generating a pulse train at least partially based on the received duty cycle, and pulsing the electric motor with the generated pulse train. The received duty cycle is selected for delivering a target torque from the electric motor. The generated pulse train is optimized to improve at least one of noise, vibration, or harshness of the electric motor.

In embodiments, generating the pulse train includes a pulse train having a range of 2 to 20 pulses. Generating the pulse train may include generating a pulse train having a first pulse, a second pulse, and a third pulse. The first time may be defined from a stop time of the first pulse to a start time of the second pulse. The second time may be defined from a stop time of the second pulse to a start time of the third pulse. The first time may be different from the second time. Generating the pulse train may include generating a pulse train in which the first time is greater than the second time.

In some embodiments, generating the pulse train includes generating a pulse train that includes a first pulse and a second pulse. The first pulse may have a first torque and the second pulse may have a second torque that is different from the first torque. Generating the pulse train may include generating a pulse train that includes a third pulse that has a third torque that is different from the first torque and the second torque. Generating the pulse train may include generating a pulse train in which a torque of each pulse of the pulse train is within 10% of an average torque of the pulses of the pulse train.

In certain embodiments, generating the pulse train is based at least partially on operating conditions of the driven equipment. Generating the pulse train may include generating a pulse train in which each pulse of the pulse train has a pulse torque greater than the target torque. Pulsing the electric motor with the generated pulse train may propel a vehicle.

In another embodiment of the present disclosure, a non-transitory computer readable-medium having instructions stored thereon that, when executed by a controller, cause the controller to generate a pulse train based at least partially on a received duty cycle, and pulse an electric motor with the generated pulse train. The generated pulse train is optimized to improve at least one of noise, vibration, or harshness of the electric motor to deliver a target torque.

In embodiments, the controller generates the pulse train to include a range of 2 to 20 pulses. The controller may generate the pulse train to include a first pulse, a second pulse, and a third pulse. A first time may be defined from a stop time of the first pulse to a start time of the second pulse and a second time may be defined from a stop time of the second pulse to a start time of the third pulse. The first time may be different from the second time. The controller may generate the pulse train such that the first time is greater than the second time.

In some embodiments, the controller generates the pulse train to include a first pulse and a second pulse. The first pulse may have a first torque and the second pulse having a second torque different from the first torque. The controller may generate the pulse train at least partially on operating conditions of the driven equipment.

In another embodiment of the present disclosure, a controller to operate an electric motor to rotate a driven component includes a processor and memory including a program to cause the processor to generate a pulse train based at least partially on a received duty cycle and pulse an electric motor with the generated pulse train. The generated pulse train being optimized to improve at least one of noise, vibration, or harshness of the electric motor to deliver a target torque.

In embodiments, the processor generates the pulse train to include a range of 2 to 20 pulses. The memory may include a plurality of optimized pulse trains corresponding as a function of a received duty cycle.

In another embodiment of the present disclosure, a drive system includes a structure having at least one resonant frequency, a driven component, an electric motor fixed to the structure for rotating the driven component, and a controller as described and detailed herein.

In another embodiment of the present disclosure, a method of controlling an electric motor includes receiving a requested torque for the electric motor to propel a vehicle and pulsing the electric motor at a pulsed torque greater than the requested torque to deliver the requested torque.

In some embodiments, receiving the requested torque for the electric motor includes receiving or calculating a duty cycle for the electric motor to deliver the requested torque by pulsing the electric motor at an optimum efficiency point. The method may further include generating a pulse train at least partially based on the received duty cycle. Pulsing the electric motor at the pulsed torque includes pulsing the electric motor with the generated pulse train. The generated pulse train may be optimized to improve at least one of noise, vibration, or harshness of the electric motor.

In certain embodiments, generating the pulse train includes generating a pulse train having a range of 2 to 20 pulses. Generating the pulse train may include generating a pulse train comprising a first pulse, a second pulse, and a third pulse. The first time defined from a stop time of the first pulse to a start time of the second pulse, a second time defined from a stop time of the second pulse to a start time of the third pulse. The first time may be different from the second time. Generating the pulse train may include generating a pulse train in which the first time is greater than the second time.

In particular embodiments, generating the pulse train includes generating a pulse train comprising a first pulse and a second pulse. The first pulse has a first torque and a second pulse. The first pulse has a first torque and the second pulse having a second torque different from the first torque. Generating the pulse train may include generating a pulse train that includes a third pulse having a third torque different from the first torque and the second torque. Generating the pulse train may include generating a pulse train in which a torque of each pulse of the pulse train is within 10% of an average torque of the pulse train.

In embodiments, generating the pulse train includes generating a pulse train based at least partially on operating conditions of the driven equipment. Generating the pulse train may include generating a pulse train in which each pulse of the pulse train has a pulse torque greater than the requested torque.

In another embodiment of the present disclosure, a controller to operate an electric motor to rotate a driven component includes a processor and a memory including a program to cause the processor to receive a requested torque for the electromotor to propel a vehicle and pulse the electric motor at a pulsed torque greater than the requested torque to deliver the requested torque such that the electric motor is pulsed at the pulsed torque to rotate the driven component such that the driven component propels a vehicle.

In some embodiments, the program further causes the processor to generate a pulse train based at least partially on the received duty cycle and pulse the electric motor with the generated pulse train. The generated pulse train may be optimized to improve at least one of noise, vibration, or harshness of the electric motor to deliver a target torque.

In another embodiment of the present disclosure, a drive system includes a structure having at least one resonant frequency, a driven component, an electric motor fixed to the structure for rotating the driven component and a controller to operate an electric motor to rotate a driven component includes a processor and a memory including a program to cause the processor to receive a requested torque for the electromotor to propel a vehicle and pulse the electric motor at a pulsed torque greater than the requested torque to deliver the requested torque such that the electric motor is pulsed at the pulsed torque to rotate the driven component such that the driven component propels a vehicle.

Further, to the extent consistent, any of the embodiments or aspects described herein may be used in conjunction with any or all of the other embodiments or aspects described herein.

BRIEF DESCRIPTION OF THE DRAWINGS

Various aspects of the present disclosure are described hereinbelow with reference to the drawings, which are incorporated in and constitute a part of this specification, wherein.

DETAILED DESCRIPTION

Figure 1:
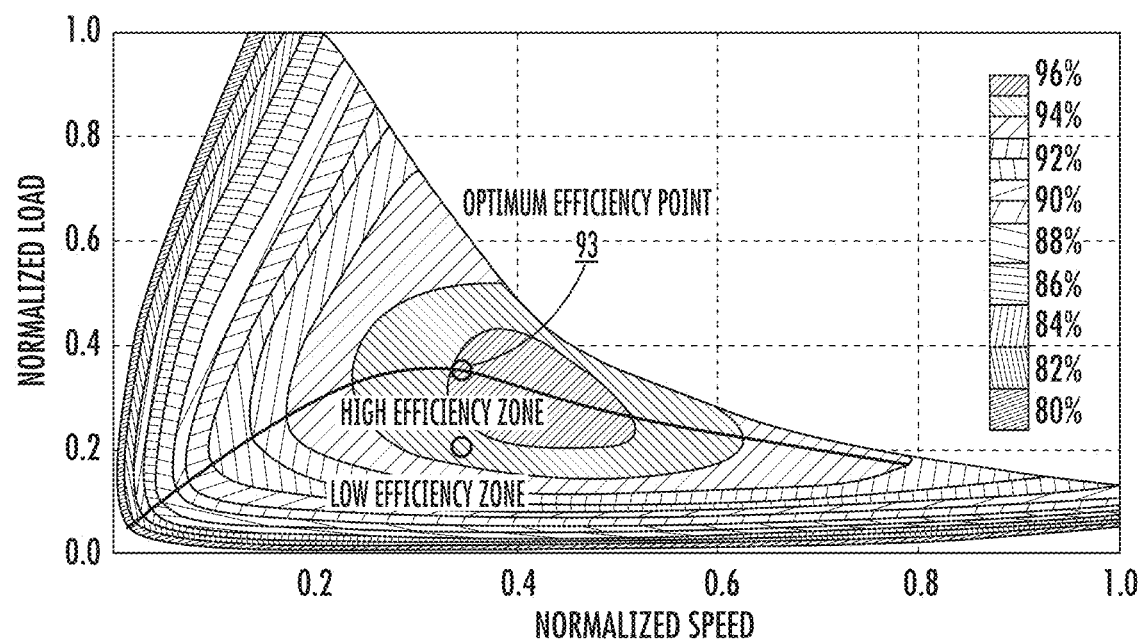
FIG. 1 is a representation of an efficiency of an example electric motor over a range of load and speeds of the electric motor.

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Features from one embodiment or aspect can be combined with features from any other embodiment or aspect in any appropriate combination. For example, any individual or collective features of method aspects or embodiments can be applied to apparatus, product, or component aspects or embodiments and vice versa. The disclosure may be embodied in many different forms and should not be construed as limited to the embodiments set forth herein; rather, these embodiments are provided so that this disclosure will satisfy applicable legal requirements. As used in the specification and the appended claims, the singular forms "a," "an," "the," and the like include plural referents unless the context clearly dictates otherwise. In addition, while reference may be made herein to quantitative measures, values, geometric relationships or the like, unless otherwise stated, any one or more if not all of these may be absolute or approximate to account for acceptable variations that may occur, such as those due to manufacturing or engineering tolerances or the like.

To increase efficiencies of an electric motor in a low torque range of the electric motor, the electric motor may be pulsed to reduce a duty cycle of the electric motor to provide a target torque or demand torque as an average torque delivered over time by pulsing the electric motor at an optimal efficiency point or torque at a modulation frequency. This pulsing of the electric motor may have a Pulse Width Modulation (PWM) waveform for torque delivery. The duty cycle is selected to provide a low target torque to the driven equipment while pulsing the electric motor at the optimal efficiency point. The modulation frequency may be selected to satisfy noise, vibration, and harshness (NVH) requirements and/or to reduce or minimize transition losses between an off-state and an on-state of the electric motor. In certain embodiments, the modulation frequency is selected based on a torsional vibration of the driven equipment For example, an electric motor may be pulsed at an efficient torque of 200 Nm with a 20% duty cycle to provide a target average torque of 40 Nm to driven equipment. Depending on the NVH characteristics of the driven equipment, the 200 Nm pulses may be delivered at a modulation frequency of 30 Hertz (Hz). In an example electric motor, in certain operating conditions, pulsing the electric motor to lower a duty cycle to deliver the target torque has been shown to be 9% more efficient than the electric motor providing torque demanded through continuous torque delivery.

The type of electric motor may affect efficiency gains from pulsing of the electric motor. Pulsing an electric motor may reduce inverter losses, copper losses, and/or core losses. Inverter losses may be reduced by turning the inverter off during low torque periods of a waveform. Copper losses may be reduced depending on the type of electric motor. For example, reductions in copper losses may be found in electric motor types that need significant levels of current before torque is produced. For example, synchronous reluctance motors may have reductions in copper loss and surface permanent magnet motors may have an increase in copper losses. Core losses may be reduced by periodically turning of magnetic flux in electric motors that rely less on permeant magnets.

With reference to FIG. 1, an efficiency of an example electric motor in a continuous operation is illustrated. As detailed herein, Dynamic Motor Drive or DMD® is a method of pulsing an electric motor intermittently to operate the electric motor only at the highest possible electromagnetic efficiency. To increase an efficiency of an electric motor, when torque requested is below a high efficiency zone of the electric motor, a controller of the electric motor may intermittently operate the electric motor in the high efficiency zone. For example, when the electric motor has an optimum efficiency point at 34% of maximum torque and the requested torque is 19% of the maximum torque, the controller for the electric motor may operate the electric motor at 34% of maximum torque for 19/34 or 56% of the time, or a 56% duty cycle, to deliver the 19% of maximum torque more efficiently than through continuous torque delivery.

Figure 2A:
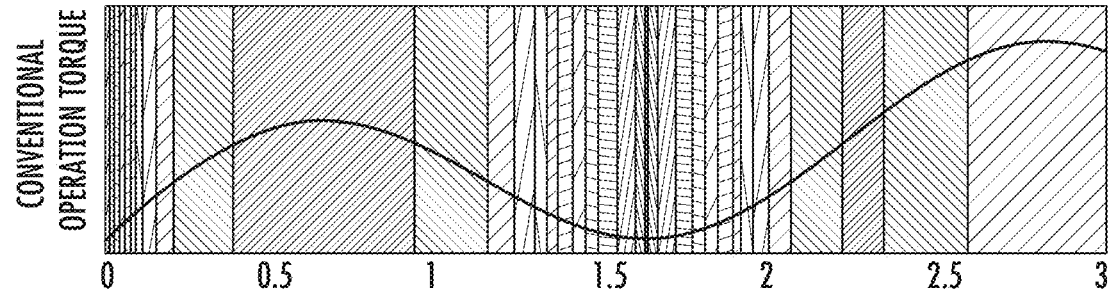
FIG. 2A is a representation of an efficiency of the electric motor of FIG. 1 over a range of time with an example torque demand with continuous torque delivery.
Figure 2B:
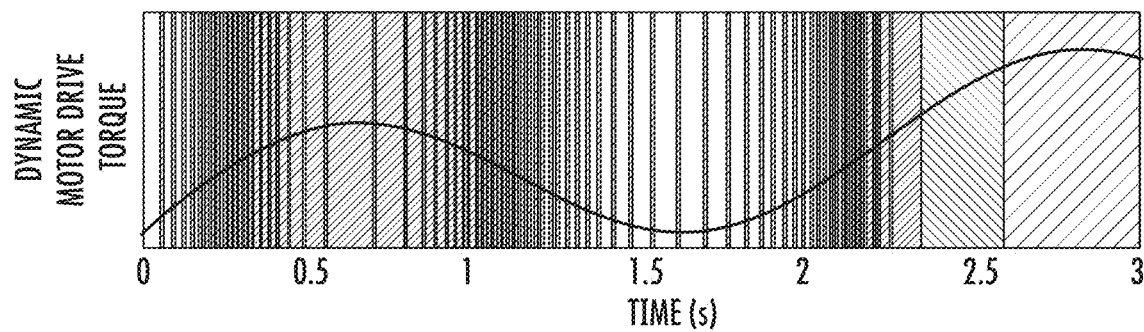
FIG. 2B is a representation of an efficiency of the electric motor of FIG. 1 over the range of time with the example torque demand of FIG. 2B with pulsed torque delivery.

With additional reference to FIGS. 2A and 2B, this intermittent or pulsing of the electric motor by a controller of the electric motor is shown as requested torque changes over time. As shown in FIG. 2A, when continuous torque is delivered from the electric motor, an efficiency of the electric motor varies from a highly efficient zone, e.g., from about 0.45 seconds to about 0.95 seconds, to a low efficiency zone, e.g., from about 1.5 seconds to about 1.75 seconds. In contrast, as shown in FIG. 2B, the electric motor is controlled to intermittently operate at an optimum efficiency point at a varied duty cycle when the requested torque is at or below the optimum efficiency point, e.g., up until about 2.25 seconds, and operates in a continuous mode, e.g., from about 2.3 seconds, when the requested torque is above the optimum efficiency point.

Figure 3:
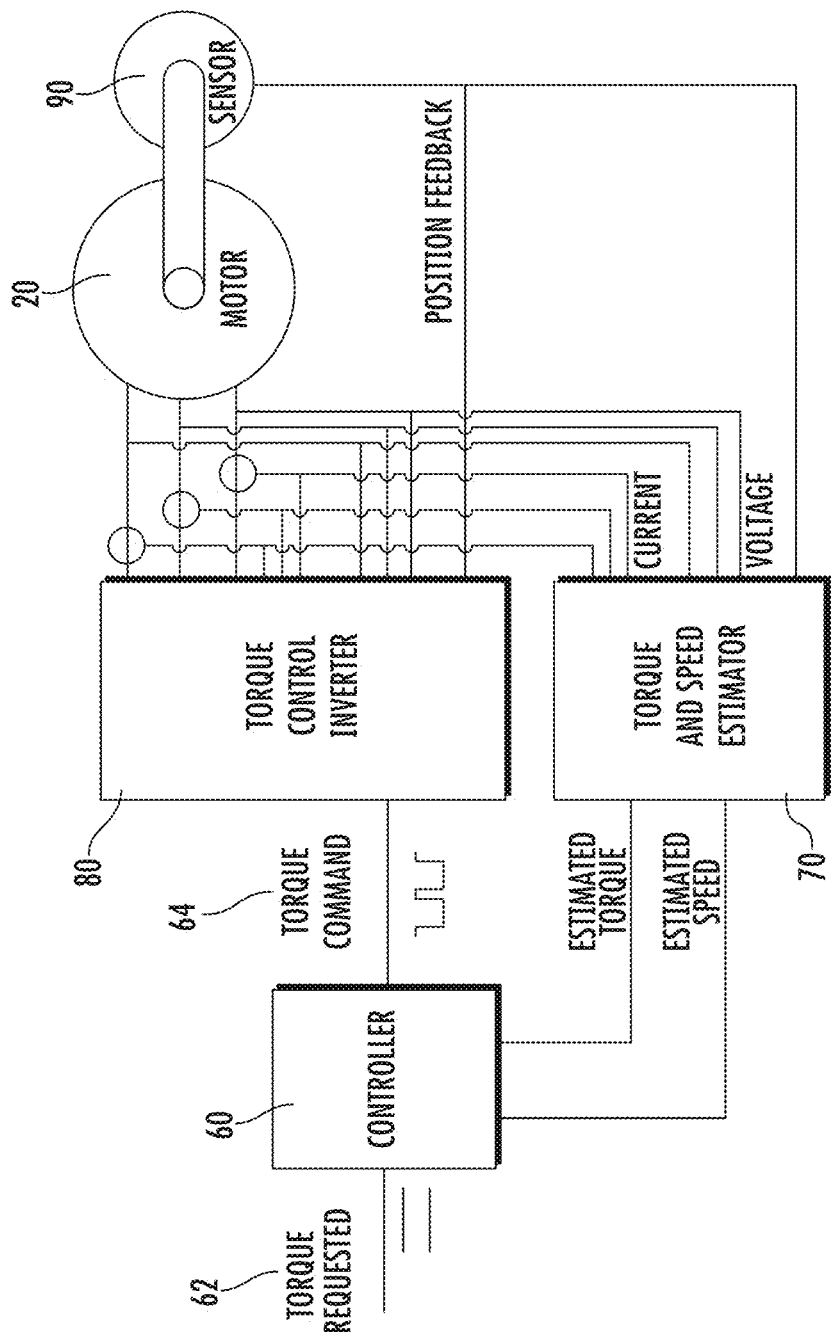
FIG. 3 is a schematic of an example control system provided in accordance with the present disclosure.

FIG. 3 is an example schematic control assembly 50 for an electric motor 20 provided in accordance with an embodiment of the present disclosure. The control assembly 50 includes a controller 60, a torque and speed estimator 70, a torque control inverter 80, and a sensor 90. The controller 60 receives the average torque demand or requested torque and determines whether to operate the electric motor 20 in a continuous mode or a pulsed mode. When the controller 60 determines to operate the electric motor 20 in a pulsed mode, the controller 60 may determine a duty cycle of the electric motor, a frequency of pulses, or a waveform of the pulses of the electric motor 20.

Figure 4:
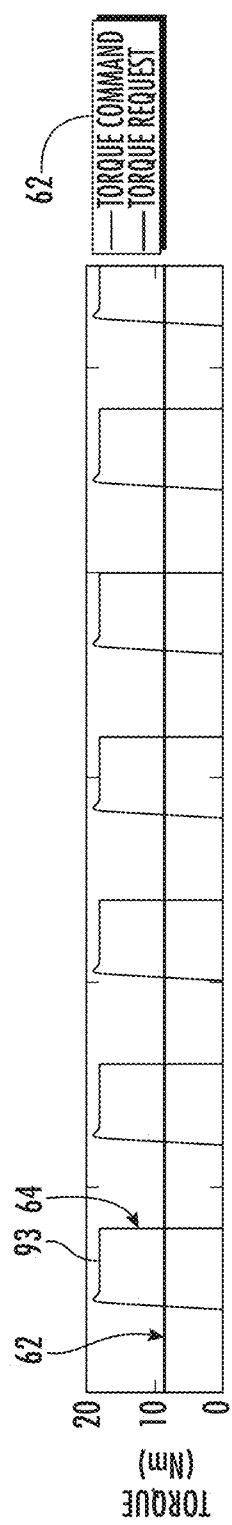
FIG. 4 is an example of pulsed torque delivery provided in accordance with the present disclosure.

FIG. 4 shows an example torque request and torque command for the controller 60. The torque request 62 is constant and below the optimum efficiency point 93 of the electric motor 20. In response to the torque request 62, the controller 60 delivers a torque command 64 to the electric motor 20. As shown, the torque command 64 is a square wave oscillating between the optimum efficiency point 93 to operate the electric motor at optimum efficiency and a zero torque. Possible waveforms may be preprogrammed and stored in the controller 60 with the controller 60 selecting from a preprogrammed waveform based on a requested torque and/or a speed of the electric motor 20.

As noted above, electric motors typically provide a substantially continuous torque. As a result, electric motors may be directly mounted to structure and are directly coupled to driven equipment. This is different from internal combustion motors that are typically mounted to structure by one or more vibration isolating mounts to reduce the transfer of vibrations from the motor to the structure. Similarly, internal combustion motors may include vibration isolating elements, e.g., a flywheel, such that the pulsations in torque delivery from the internal combustion motor are isolated from being transferred to the driven equipment. As a result of being directly mounted to structure and the driven equipment, pulsing an electric motor at a modulation frequency may result in undesirable vibrations being transmitted to structure and/or driven equipment. In particular, the torsional vibrations as a result of pulsing the electric motor may result in undesirable vibrations in structure and/or driven equipment. In some embodiments, electric motors may be mounted with compliant mounts that isolate some vibration from the electric motor.

Figure 5:
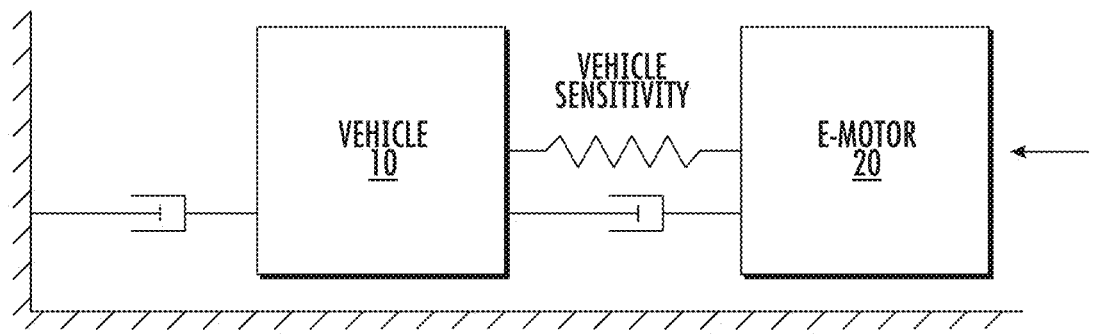
FIG. 5 is a schematic view of an electric motor mounted to a structure of a vehicle to model a response to the vibrations of the torque delivery of the electric motor.
Figure 7:
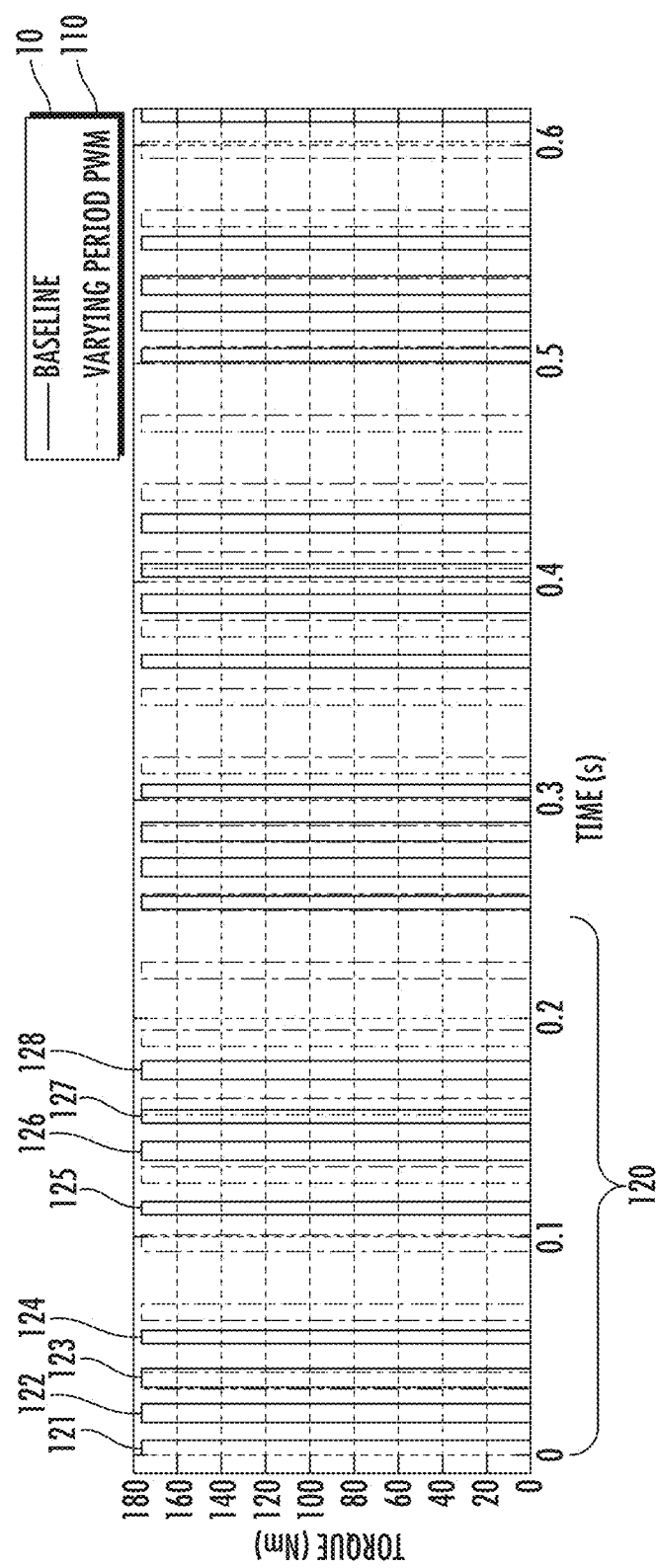
FIG. 7 is a chart of a baseline PWM and an optimized PWM pulse train provided in accordance with the present disclosure.

With reference to FIG. 5, a simplified model of a vehicle 10 being driven by a pulsed electric motor 20 is shown. FIG. 7 shows an example model of a frequency response of the vehicle 10 over a range of frequencies including a natural resonant frequency 32. As shown, the structure of the vehicle 10 has a natural resonance or frequency response peak 32 at approximately 16 Hz.

As detailed above, pulsing the electric motor 20 at an optimal efficiency point at a modulation frequency to reduce the duty cycle of the electric motor 20 allows for the delivery of a target torque below the optimal efficiency point at a higher efficiency than continuously providing the target torque from the electric motor 20. The low target torque may be in a range of 0 percent to 60 percent of the optimal efficiency point of the electric motor 20. In some embodiments, the electric motor 20 may be pulsed to provide between 0 percent and 100 percent of the optimal efficiency point of the electric motor 20. The target torque delivered by the electric motor 20 can be controlled by increasing or decreasing the duty cycle of an excitation torque at which the electric motor 20 is pulsed or excited. The excitation torque may be selected to be an optimal efficiency point for the electric motor 20 and may be in a range of 30 percent to 80 percent, e.g., 60 percent, of the maximum torque or rated torque of the electric motor 20.

With a pulse torque selected at an optimal efficient point of the electric motor 20, the torque delivered by the electric motor 20 can be controlled by adjusting the duty cycle of the electric motor 20. For example, increasing the duty cycle will increase the torque delivered and decreasing the duty cycle will decrease to lower the torque delivered. With respect to efficiency of the electric motor 20, a lower modulation frequency or number of pulses may be more efficient than a higher modulation frequency or number of pulses. For example, the improved efficiency of the electric motor 20 may be attributed to transition losses of the electric motor 20 as the electric motor 20 is pulsed between an off-state and an on-state.

Referring now to FIG. 7 the pulsing of the electric motor may have a Pulse Width Modulation (PWM) waveform of torque delivery. The peaks of the PWM waveform represent a pulse torque is being delivered. As shown in FIG. 7, the baseline PWM 10 has a constant modulation frequency and a constant pulse torque. The baseline PWM 10 has a duty cycle which is the percentage of time which the pulse torque is being delivered. The torque delivered by a baseline PWM 10 is the average of the torque delivered over time and may be approximated by the product of the pulse torque and the duty cycle. The baseline PWM 10 may have a transition ramp between the off-state and the on-state and the on-state and the off-state. This transition ramp may be a function of an inverter of the electric motor 20. As shown, the baseline PWM 10 has an ideal transition such that the transition ramp is shown as vertical.

Figure 9:
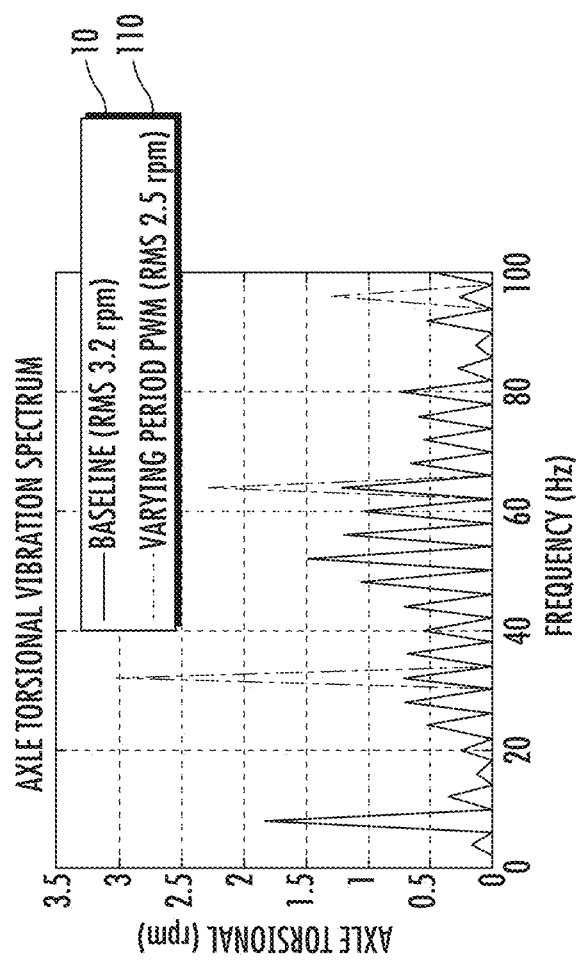
FIG. 9 is a chart of an axial torsional vibration spectrum of the baseline PWM and the optimized PWM pulse train.
Figure 8:
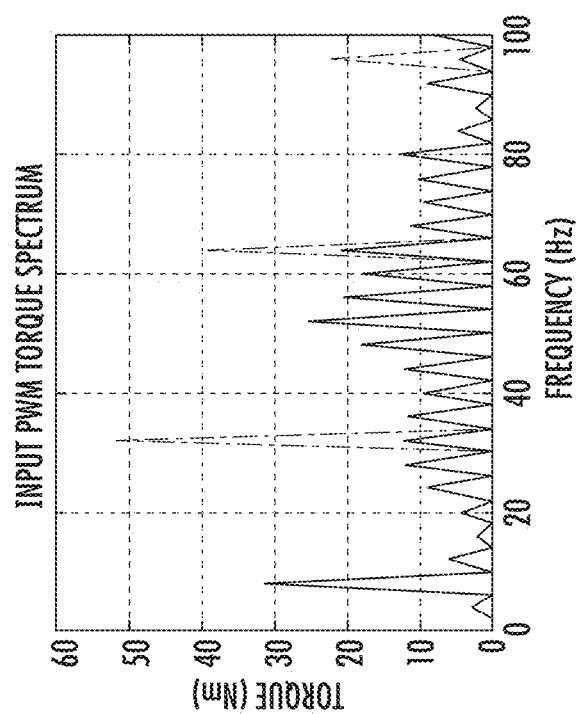
FIG. 8 is a chart of an input torque spectrum of a baseline PWM and the optimized PWM pulse train.

With additional reference to FIGS. 8 and 9, when the pulse torque and the modulation frequency are constant, an input PWM torque spectrum and a torsional vibration spectrum have significant peaks at the modulation frequency and at multiples thereof. For example, as shown in FIG. 4, when the electric motor 20 is pulsed at 175 Nm with a modulation frequency of 32 Hz, the PWM torque spectrum shows an initial peak response around the modulation frequency of 32 Hz but also shows secondary peaks in the spectrum at two and three times the modulation frequency, e.g., 64 Hz and 96 Hz, with a decreasing amplitude as the frequency increases. While the response to a pulsed torque may vary, as shown in this example, the first peak at 32 Hz is above 50 Nm, the second peak at 64 Hz is about 40 Nm, and the third peak at 96 Hz is just above 20 Nm. Similarly, the torsional vibration spectrum has strong peaks at the modulation frequency of 32 Hz and decreasing peaks at 64 Hz and 96 Hz. For this example, the first torsional peak at 32 Hz is over 3 rpm, the second torsional peak at 64 Hz is below 0.5 rpm, and the third torsional peak at 96 Hz is minimal.

As a result of these strong peaks, the baseline PWM 10 may induce vibrations within equipment driven by the electric motor 20. These vibrations may create unsatisfactory or uncomfortable NVH, for instance as experienced by an occupant, within driven equipment such as a vehicle. The unsatisfactory or uncomfortable NVH may be emphasized when the input peaks are at or near a sensitive frequency of the driven equipment. For example, a vehicle may have sensitives to particular frequencies. These sensitivities can be expressed as a frequency response function (FRF). When the amplitude of a FRF is high at a particular frequency, such a frequency can be considered a sensitive frequency. When the driven equipment is a vehicle, the FRF may consider an occupant's perception of NVH when indicating sensitive frequencies. For example, if an occupant would notice a vibration in a particular frequency that frequency may be shown in the FRF as having a high amplitude. Similarly, if an audible noise would be generated as a result of a frequency, such a frequency may have a high amplitude in the FRF. In some embodiments, the FRF may be of a structure of the driven equipment such that natural resonances may have high amplitudes in the FRF. For example, FIG. 2 may represent a FRF for driven equipment.

The strong peaks of the input torque spectrum and the torsional vibration spectrum may cause premature wear or failure of components of the vehicle 10. For example, undesirable vibrations in components of the drive train may result in premature wear and/or failure of these components. As such, it is desirable to reduce the amplitude of or eliminate the undesirable vibrations of the vehicle 10 and/or the drivetrain to extend the life of driven equipment.

Figure 10:
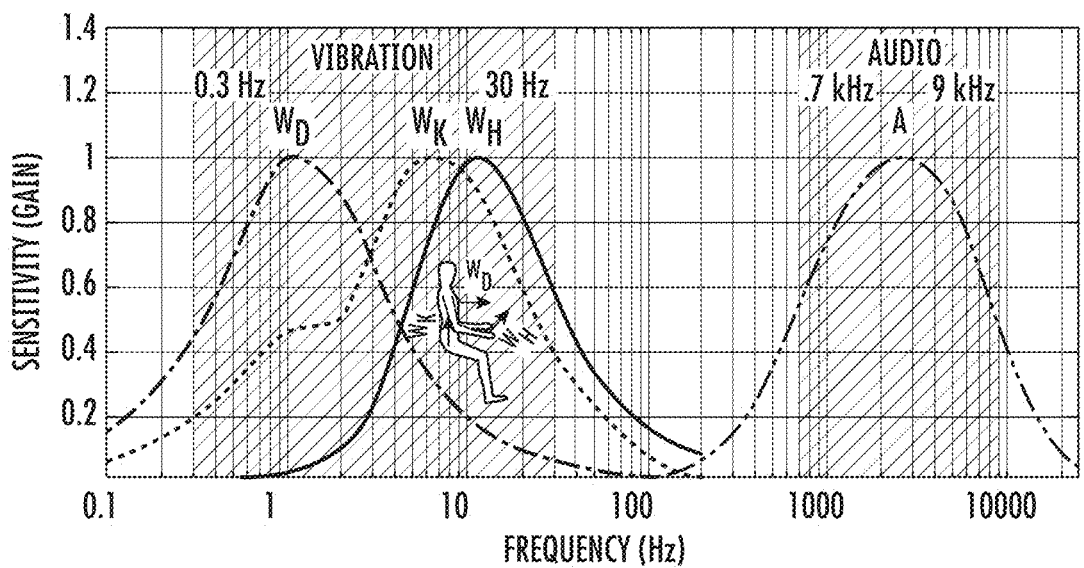
FIG. 10 is a chart of human vibration and sonic sensitivity over a range of frequencies.

FIG. 10 is an example of human sensitivity to vibration. The shaded areas of the chart show that humans are sensitive to vibrations in a range of 0.3 Hz to 30 Hz and are sensitive to sound or audio in a range of 7 kHz to 9 kHz. As such, modulation frequencies in these ranges may create unsatisfactory or uncomfortable NVH for a human occupant of a vehicle.

Figure 11:
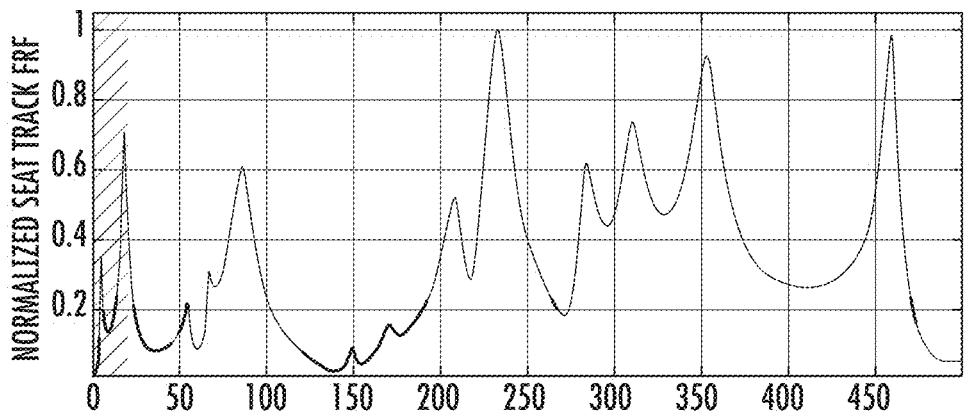
FIG. 11 is a frequency response function of a seat track of an example vehicle.
Figure 12:
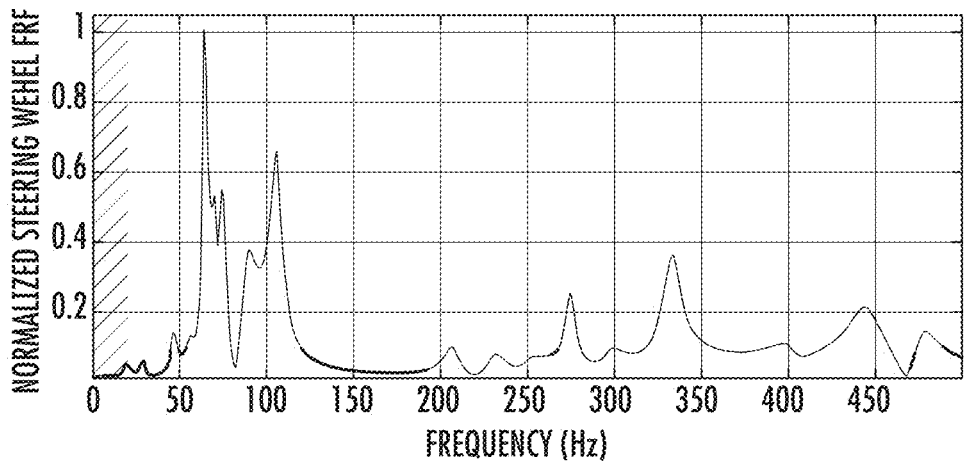
FIG. 12 is a frequency response function of a steering wheel of an example vehicle.

FIGS. 11 and 12 are examples of a seat track FRF and a steering wheel FRF for an example vehicle, respectively. The lower vibrational sensitive of humans, e.g., 0.3 Hz to 30 Hz, is shaded to indicate that this range is undesirable for a modulation frequency. In addition, areas where transmission of vibration through the seat track and the steering wheel are low as indicated by an increased thickness of the FRF response line. The indicated ranges at which transmission of vibration is low may be a modulation frequency suitable to minimize NVH to a driver and/or human occupant. As shown, a large range between 25 Hz and 40 Hz and between 48 Hz and 52 Hz and between 120 Hz and 185 Hz all appear to be suitable for this example vehicle. These FRF plots may be specific for a particular model or type of vehicle such that suitable ranges for modulation frequencies may be vehicle model or type specific. In addition to the seat track and the steering wheel FRF, other FRF's may be considered to optimize an NVH for a particular vehicle. For example, the FRF of particular components of the vehicle may be determined, e.g., drivetrain components or driven equipment.

Referring back to FIG. 7, a modified or optimized PWM waveform is disclosed in accordance with an embodiment of the present disclosure and is referred to generally as modified PWM 110. The modified PWM 110 is superimposed over a baseline PWM 10. While the modified PWM 110 and baseline PWM 10 are shown with an ideal or instant transition between an off-state and an on-state, it is contemplated that there may be a transition ramp between the off-state and on-state. As shown, the duty cycle of the modified PWM 110 and the baseline PWM 10 are the same such that the average torque delivered by the modified PWM 110 and the baseline PWM 10 are the same.

The modified PWM 110 is generated by creating a pulse train that includes a number of pulses that are optimized to provide the target torque while maximizing a NVH rating for driven equipment and/or structure associated with the electric motor. The NVH rating may be analyzed by comparing a PWM input spectrum and/or a torsional vibration spectrum of the pulse train to a FRF of the driven equipment. For example, comparing the spectrums of FIGS. 8 and 9 with the FRFs of FIGS. 6 and 10-12.

The optimized pulse train modifies a timing of each pulse of the pulse train to minimize a response spectrum of driven equipment and/or structure associated with the electric motor. As shown, a pulse train 120 of the modified PWM includes 8 pulses 121-128. The number of pulses in a pulse train may be in a range of 2 to 20 pulses, e.g., 8 pulses. In some embodiments, the number of pulses in the pulse train may be greater than 20 pulses. The pulse train 120 has the same number of pulses as the constant pulses of the baseline PWM 10 over the entire length of the pulse train 120. However, the pulses 121-128 of the pulse train 120 are timed such that a response spectrum of driven equipment and/or structure associated with the electric motor is reduced. This is shown by the PWM 10 and the PWM 110 having 8 pulses spanning approximately 0.25 seconds before the PWM 10 and the PWM 110 repeat.

Where the PWM 10 shows a constant pulse rate of 32 Hz or a pulse initiating every 0.03125 seconds, the pulses 121-128 of the pulse train 120 have varying intervals between the pulses 121-128 are not equally spaced from one another. As shown, the length or duration of the pulse 121-128 may vary relative to one another. For example, pulses 124 and 125 have a duration or length less than some of the other pulses 121, 122, 123, 126, 127, 128. In some embodiments, the duration or length of each pulse 121-128 is the same. Also as shown, the torque of each pulse 121-128 is constant. In some embodiments, the torque of each pulse 121-128 may vary from one another. In such embodiments, while the torque of each pulse 121-128 may vary, the efficiency of each pulse may be substantially equal to one another. When the torque of some of the pulses 121-128 varies, the torque of each pulse 121-128 may be within 10% of a mean average of the torque of all of the pulses 121-128.

The pulse train 120 may be an optimal pulse train for a given duty cycle of the electric motor 20, e.g., a 20% duty cycle. When a different target torque is demanded, the duty cycle may change to deliver the different target torque. As a result in the change in the duty cycle, a new optimized pulse train may be generated for the new duty cycle. This change in duty cycle is the result of the pulse torque being substantially constant at an optimal efficiency point of the electric motor 20 such that the duty cycle is varied to vary the torque delivered. When the new duty cycle is selected, a new pulse train 120 is generated to deliver the new duty cycle and thus, the new target torque which is also optimized for the NVH characteristics of the driven equipment.

In addition to a unique pulse train to deliver each duty cycle, a given duty cycle may have a unique pulse train for a variety of conditions including, but not limited to, weather, weight of passengers and/or cargo, incline, road conditions, acoustic settings (radio volume), temperature, motor speed (RPM), vehicle speed, velocity, or acceleration. For example, there may be a unique pulse train for a 20% duty cycle when a single occupant is sensed in the vehicle and a different unique pulse train for a 20% duty cycle when two occupants, three occupants, four occupants, or no occupants are sensed in the vehicle. In some embodiments, if a vehicle is being operated on a rough road, the NVH rating of the electric motor may be worse and be masked by the road condition to provide a more efficient operation than with an increased NVH rating.

The optimization for each duty cycle or condition may minimize a cost function that includes a NVH rating for a range of relevant frequencies, any efficiency loss between the modified PWM 110 and a baseline PWM 10, and capabilities of the electric motor and associated components to deliver the modified PWM 110.

The NVH rating may be an aggregate of occupant perception level in view of a frequency response function (FRF) for the relevant frequencies, e.g., an RMS average. The FRF may involve an estimate of the frequency-dependent gain of occupant perception of NVH with respect to pulses of the electric motor 20. The FRF may include frequency ranges of high sensitivity. For example, frequencies that may include driveline torsional resonances, body structural resonances, or where human occupants are sensitive to noise and/or vibration. The FRF may also identify frequency ranges of low sensitivity, e.g., frequencies that are inherently of low sensitivity or are tuned to be of low sensitivity.

The optimization for a given duty cycle may be modeled with an optimized pulse train being stored in a table for each duty cycle. The table may include an optimized pulse train for a variety of conditions for each duty cycle. An optimized pulse train stored in the table includes properties of each pulse in the pulse train. The properties of each pulse may include a start time, a stop time, a pulse length, or a torque. By optimizing the properties of each pulse in the pulse train, it may be possible to shift excitation energy away from frequencies of the FRF that are sensitive, e.g., frequencies of the FRF with high amplitude, and toward frequencies where the FRF is less sensitive, e.g., frequencies of the FRF with low amplitude. It some embodiments, the excitation energy may be shifted towards repeated sub-sequences or phrases of pulses having lengths of half, one-third, or one fourth that of the pulse train. Such repeated sub-sequences of pulses may result in entire groups of subharmonic frequencies to have zero amplitude. For example, pulse train 120 includes a first phase including pulses 121-124 and a second phase including pulses 125-128 with each of the first phase and the second phase being half the length of the pulse train 120 as shown in FIG. 7.

Figure 6:
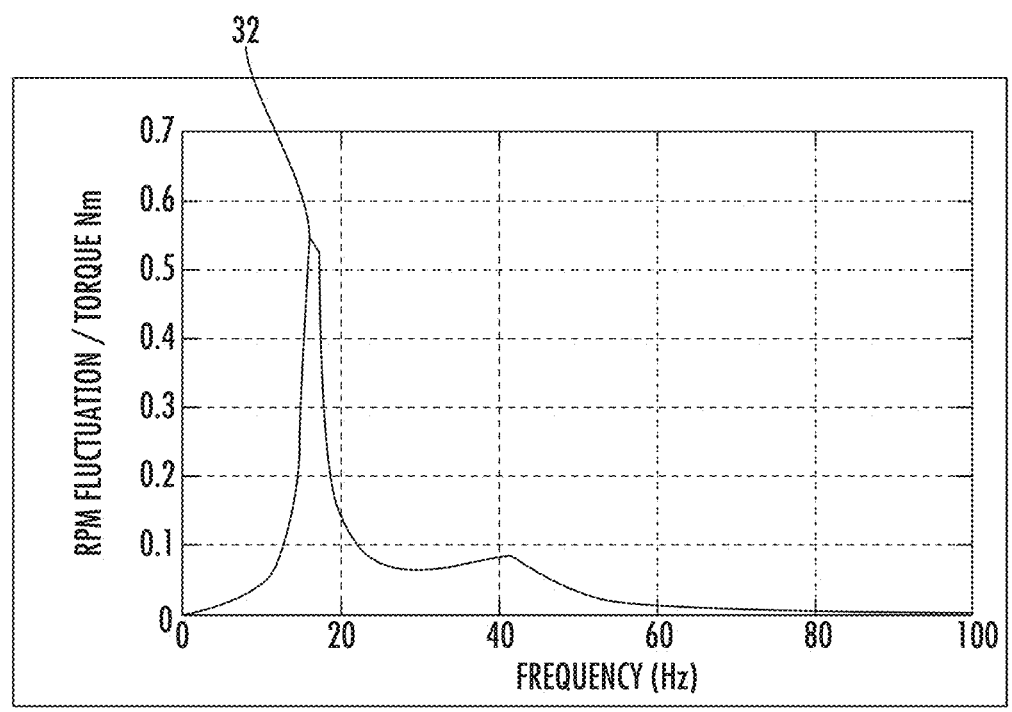
FIG. 6 is a chart showing an example frequency response of the structure of the vehicle of FIG. 1.

Referring back to FIGS. 8 and 9, the torque spectrum and the torsional vibration spectrum of the modified PWM 110 are illustrated over the spectrums of the baseline PWM 10. As shown, the spectrums of the modified PWM 110 have a plurality of peaks with similar amplitudes. In addition, the peaks are shifted away from 16 Hz which is a sensitive frequency of the vehicle, as shown in FIG. 6. With particular reference to FIG. 8, a number of the peaks have an amplitude around 10 Hz such that these peaks may act as white noise such that the peaks may be imperceptible to an occupant of the vehicle. Similarly, the torsional vibration spectrum shown in FIG. 9 shows a significant reduction in the amplitude of the peaks to between 0.5 and 1 RPM where the baseline PWM 10 resulted in a peak over 3 RPM. Similar to the torque spectrum, the peaks of the torsional vibration spectrum of the modified PWM 110 may act as white noise such that the peaks may be imperceptible to an occupant of the vehicle.

The method of canceling vibration can be executed in a controller of the electric motor 20 without the need for vibration mitigation hardware, e.g., vibration isolating engine mounts or a fly wheel. The method includes generating an optimized pulse train of pulses for a given duty cycle such that vibration induced by pulsing the electric motor is reduced or completely canceled. The pulse trains may be optimized to shift excitation energy of the motor away from frequencies of the FRF of the driven equipment that are sensitive to frequencies of the FRF of the driven equipment that are less sensitive. This shifting of excitation energy may be done in such a way that the overall torsional vibration response of the driven equipment is minimized compared to steady phase pulsation while operating within the limitations of the inverter and maintaining the efficiency gains of from pulsing the electric motor 20. To excite the electric motor 20, the controller of the electric motor 20 can provide signals or provide current to the electric motor 20. The method 200 of canceling vibrations may be active whenever the controller pulses the electric motor or may only be active when pulsing the electric motor 20 in a stead PWM fashion would result in unacceptable NVH of the driven equipment.

The optimized or modified pulse trains for each duty cycle and/or operating condition may be generated and stored in a table or be generated in real time. To generate the optimized pulse train for a duty cycle, a baseline PWM frequency may be chosen to provide options across a broad duty cycle range. For example, a baseline PWM frequency of 40 Hz may be chosen as a starting point. The pulse train may be modeled for several duty cycles from 10% to 90% in increments of 5%, 10%, or 20% and for a variety of motor speeds. Each modeled pulse train may have a start time, a stop time, and a pulse torque for each pulse that is optimized to minimize the cost function. These modeled pulse trains may be stored in a table such that when a duty cycle is requested from the controller of the electric motor 20, the controller can look up a modeled pulse train for the duty cycle.

When the controller receives a requested duty cycle, the controller can identify a modeled pulse train based on the requested duty cycle. In some embodiments, the controller can identify a pulse train based on the request torque and another operating condition such as motor speed. When the requested duty cycle has a modeled pulse train, the controller instructs the electric motor 20 to be excited as modeled. When the requested duty cycle is between two modeled pulse trains, the controller may interpolate between the pulse train for a duty cycle above the requested duty cycle and the pulse train for a duty cycle below the requested duty cycle. In some embodiments, the controller may interpolate between pulse trains by identifying the duty cycle closest to the requested duty cycle for which there is a modeled pulse train and increase or decrease a length of each pulse in the modeled pulse train to provide the requested duty cycle.

In certain embodiments, adjacent duty cycles may have modeled pulse trains that are dissimilar to one another such that when a new duty cycle is requested, the controller may identify an end point of the previous pulse train or create a breakpoint in the pulse train to switch to a new pulse train for the newly requested duty cycle. If the previous pulse train and the new pulse train are significantly different from one another, e.g., have dissimilar boundaries, the controller may generate a bridge pulse train to switch between the previous pulse train and the new pulse train. The controller may perform a cost function analysis to determine if a bridge pulse train is required or if the previous pulse train can be modified, e.g., pulse lengths modified, to provide the new duty cycle with a lower cost than switching to the new pulse train. However, if the controller determines that an interpolated cost function penalty of staying with the previous pulse train exceeds the interpolated cost function penalty of switching to the new pulse train by a predetermined hysteresis cost value, the controller switches to the new pulse train.

Figure 13:
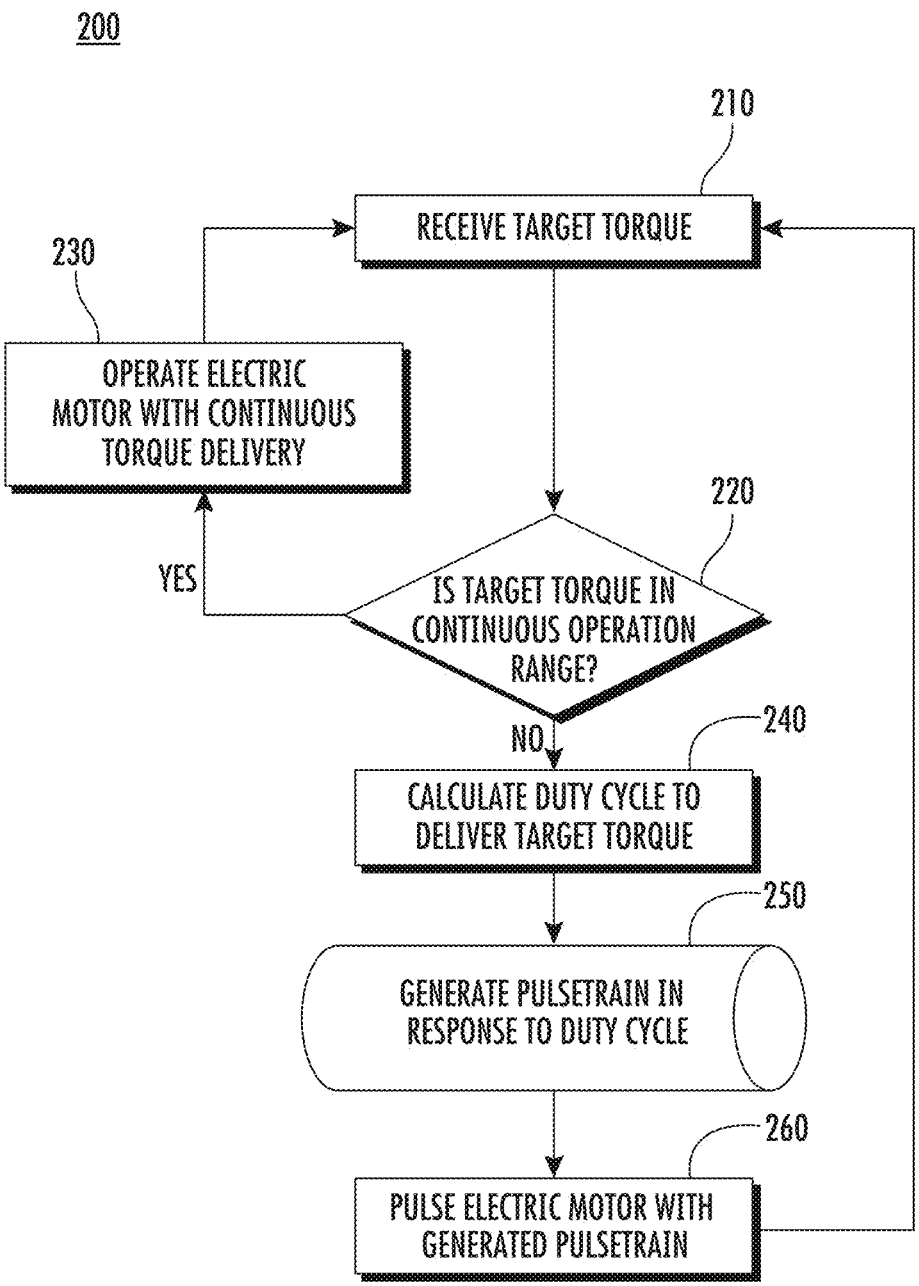
FIG. 13 is a flow chart of a method of controlling an electric motor provided in accordance with an embodiment of the present disclosure.

With reference to FIG. 13, a method of canceling vibrations from pulsing an electric motor is detailed in accordance with embodiments of the present disclosure and is referred to generally as method 200. The method 200 is executed on a controller that provides signals to an electric motor to deliver a target torque to a drive component. The method 200 is described in accordance with the model of an electric motor 20 and vehicle 10 of FIG. 5. However, the drive component may be a driveshaft or axle of a vehicle or may be a driveshaft to rotate a piece of equipment.

The method 200 may include a controller of the electric motor 20 receiving an input signal requesting a target torque from the electric motor 20 (Step 210). The controller analyzes the requested target torque to determine if the target torque is within a continuous operation range of the electric motor 20 (Step 220). The continuous operation range may be a range of torques that are at or above the optimal efficiency point of the electric motor 20. The continuous operation range may include a range of torques that are below the optimal efficiency point of the electric motor 20. For example, when the optimal efficiency point of the electric motor 20 is 60% of the maximum torque of the electric motor 20, the continuous operation range may be from 40% to 100% of the maximum torque of the electric motor 20. The continuous operation range may cover a range of torques at which continuous operation of the electric motor 20 has a greater efficiency than providing a requested torque by pulsing the electric motor 20 to reduce a duty cycle thereof.

When the requested target torque is within continuous operation range, the controller operates the electric motor 20 to deliver the target torque as a continuous torque (Step 230).

When the requested target torque is below the continuous operation range, the controller selects an optimal efficiency torque or point to pulse the electric motor 20 and calculates a duty cycle for the electric motor 20 to deliver the target torque (Step 240). The duty cycle is adjusted to set the torque delivered from the electric motor 20 to the target torque while pulsing the electric motor 20. For example, to increase a torque delivered from the electric motor 20, the duty cycle is increased and to decrease a torque delivered from the electric motor 20, the duty cycle is decreased.

With the duty cycle selected, the controller generates a pulse train of pulses to deliver the target torque in view of the duty cycle and operating conditions (Step 250). The generated pulse train is optimized to deliver the target torque while reducing responses within the driven equipment. The generated pulse train may include a number of pulses and/or a start time, a stop time, a pulse length, or a torque or amplitude of each pulse in the pulse train. The generated pulse train may be optimized for the FRF of the driven equipment and/or for the operating conditions. Generating the pulse train may include the controller identifying the duty cycle and any applicable operating conditions and looking up an optimized pulse train from a table including the duty cycle and the operating conditions. The operating conditions may include, but not be limited to, weather, weight of passengers and/or cargo, incline, road conditions, acoustic settings (radio volume), temperature, motor speed (RPM), vehicle speed, velocity, or acceleration. In some embodiments, generating the pulse train is solely determinate on the calculated duty cycle.

In certain embodiments, generating the pulse train may include the controller determining a number of pulses of the pulse train and/or a start time, a stop time, a pulse length, or a torque or amplitude of each pulse in the pulse train in real-time. In particular embodiments, generating the pulse train may include optimizing the generated pulse train based on real-time sensor data of the driven equipment including, but not limited to, vibration sensors, accelerometers, and acoustic sensors.

With the pulse train generated, the controller pulses the electric motor with the generated pulse train (Step 260). The controller may pulse the electric motor 20 with the generated pulse train until a new target torque is received by the controller.

The controller detailed above may be a standalone controller or may be part of another controller. The controller includes a processor and a memory. The controller may also include an input to receive input such as a desired torque. The controller includes a motor output that is in signal communication with an electric motor to operate the electric motor to provide a target torque. The methods detailed above may be stored in the memory of the controller as a non-transitory computer-readable medium that when executed on the processor of the controller cause the controller to execute the methods detailed above including method 200.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

What is claimed:

1. A method of controlling an electric motor, the method comprising:
    receiving, with a controller, a duty cycle for an electric motor to deliver a target torque from the electric motor;
    generating, with the controller, a torque pulse train at least partially based on the received duty cycle including a first pulse, a second pulse, and a third pulse, wherein at least one of:
        a first time is defined from a stop time of the first pulse to a start time of the second pulse and a second time is defined from the stop time of the second pulse to a start time of the third pulse, the first time being different from the second time, or
        the first pulse has a first torque and the second pulse has a second torque different from the first torque; and
    pulsing the electric motor with the generated torque pulse train, the generated torque pulse train optimized to improve at least one of noise, vibration, or harshness of the electric motor.

2. The method according to claim 1, wherein generating the torque pulse train includes generating a pulse train having a range of 2 to 20 pulses.

3. The method according to claim 1, wherein generating the torque pulse train includes the first time being different from the second time.

4. The method according to claim 3, wherein generating the torque pulse train includes generating the torque pulse train in which the first time is greater than the second time.

5. The method according to claim 1, wherein generating the torque pulse train includes the first pulse having the first torque and the second pulse having the second torque different from the first torque.

6. The method according to claim 5, wherein generating the torque pulse train includes generating the torque pulse train comprising a third pulse having a third torque different from the first torque and the second torque.

7. The method according to claim 6, wherein generating the torque pulse train includes generating the torque pulse train in which a pulse torque of each pulse of the torque pulse train is within 10% of an average torque of the torque pulse train.

8. The method according to claim 1, wherein generating the torque pulse train includes generating the torque pulse train based at least partially on operating conditions of driven equipment.

9. The method according to claim 1, wherein generating the torque pulse train includes generating the torque pulse train in which each pulse of the torque pulse train has a pulse torque greater than the target torque.

10. The method according to claim 1, wherein pulsing the electric motor with the generated torque pulse train propels a vehicle.

11. A controller to operate an electric motor to rotate a driven component, the controller comprising:
    a processor; and
    a memory including a program to cause the processor to:
        generate a torque pulse train based at least partially on a received duty cycle, the torque pulse train including a first pulse, a second pulse, and a third pulse, wherein at least one of:
            a first time is defined from a stop time of the first pulse to a start time of the second pulse and a second time is defined from the stop time of the second pulse to a start time of the third pulse, the first time being different from the second time, or
            the first pulse has a first torque and the second pulse has a second torque different from the first torque; and
        pulse an electric motor with the generated torque pulse train, the generated torque pulse train optimized to improve at least one of noise, vibration, or harshness of the electric motor to deliver a target torque.

12. The controller according to claim 11, wherein the processor generates the torque pulse train to include a range of 2 to 20 pulses.

13. The controller according to claim 11, wherein the memory includes a plurality of optimized torque pulse trains corresponding as a function of a received duty cycle.

14. A drive system comprising:
a structure having at least one resonant frequency;
a driven component;
an electric motor fixed to the structure for rotating the driven component; and
a controller according to claim 11.

15. A method of controlling an electric motor, the method comprising:
receiving, with a controller, a requested torque for the electric motor to propel of a vehicle;
generating, with the controller, a torque pulse train at least partially based on the requested torque including a first pulse, a second pulse, and a third pulse, wherein at least one of:
a first time is defined from a stop time of the first pulse to a start time of the second pulse and a second time is defined from the stop time of the second pulse to a start time of the third pulse, the first time being different from the second time, or
the first pulse has a first torque and the second pulse has a second torque different from the first torque; and
pulsing the electric motor with the generated torque pulse train at a pulsed torque greater than the requested torque to deliver the requested torque.

16. The method according to claim 15, wherein receiving the requested torque for the electric motor includes receiving or calculating a duty cycle for the electric motor to deliver the requested torque by pulsing the electric motor at an optimum efficiency point.

17. The method according to claim 16, wherein the generated torque pulse train is optimized to improve at least one of noise, vibration, or harshness of the electric motor.

18. The method according to claim 17, wherein generating the torque pulse train includes generating the torque pulse train having a range of 2 to 20 pulses.

19. The method according to claim 17, wherein generating the torque pulse train includes generating the torque pulse train comprising a first pulse, a second pulse, and a third pulse, a first time defined from a stop time of the first pulse to a start time of the second pulse, a second time defined from a stop time of the second pulse to a start time of the third pulse, the first time being different from the second time.

20. The method according to claim 19, wherein generating the torque pulse train includes generating the torque pulse train in which the first time is greater than the second time.

21. The method according to claim 17, wherein generating the torque pulse train includes generating the torque pulse train comprising a first pulse and a second pulse, the first pulse having a first torque and the second pulse having a second torque different from the first torque.

22. The method according to claim 21, wherein generating the torque pulse train includes generating the torque pulse train comprising a third pulse having a third torque different from the first torque and the second torque.

23. The method according to claim 22, wherein generating the torque pulse train includes generating the torque pulse train in which a torque of each pulse of the torque pulse train is within 10% of an average torque of the torque pulse train.

24. The method according to claim 17, wherein generating the torque pulse train includes generating the torque pulse train based at least partially on operating conditions of driven equipment.

25. The method according to claim 17, wherein generating the torque pulse train includes generating the torque pulse train in which each pulse of the torque pulse train has a pulse torque greater than the requested torque.

26. A controller to operate an electric motor to rotate a driven component, the controller comprising:
a processor; and
a memory including a program to cause the processor to:
execute the method of claim 15 to pulse the electric motor at a pulsed torque to rotate the driven component such that the driven component propels a vehicle.

27. The controller according to claim 26, wherein the program further causes the processor to:
generate a torque pulse train based at least partially on the requested torque; and
pulse the electric motor with the generated torque pulse train, the generated torque pulse train optimized to improve at least one of noise, vibration, or harshness of the electric motor to deliver a target torque.

28. A drive system comprising:
a structure having at least one resonant frequency;
a driven component;
an electric motor fixed to the structure for rotating the driven component; and
a controller according to claim 26.

* * * * *